INVENTOR.
JOHN B. KRAELING

April 5, 1966 J. B. KRAELING 3,243,973
FLEXIBLE GEAR COUPLINGS
Filed Jan. 30, 1963 5 Sheets-Sheet 2
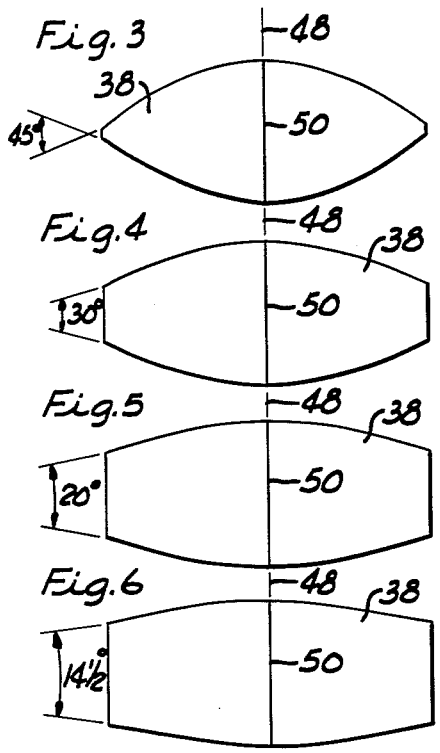
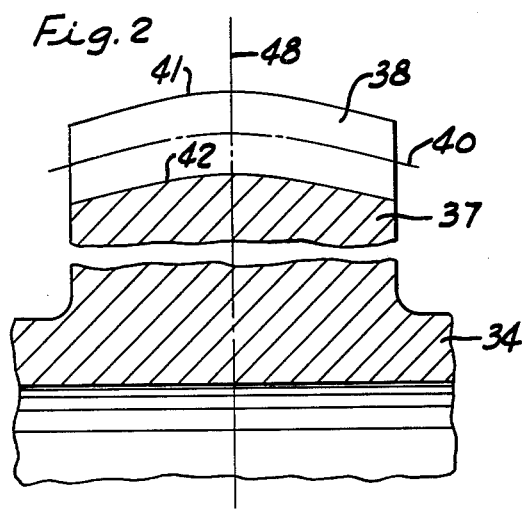
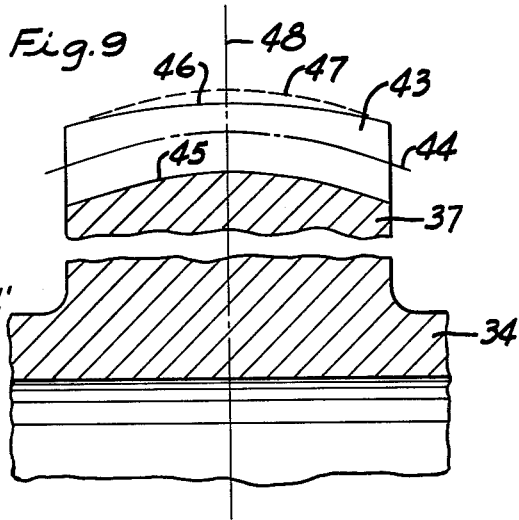
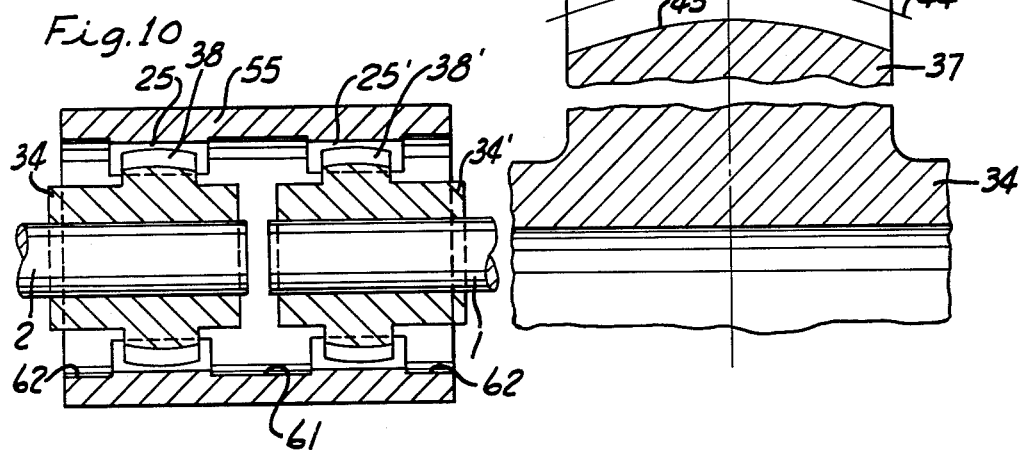
INVENTOR.
JOHN B. KRAELING
BY *William F. Carothers*
HIS ATTORNEY April 5, 1966  J. B. KRAELING  3,243,973
FLEXIBLE GEAR COUPLINGS
Filed Jan. 30, 1963  5 Sheets-Sheet 3

INVENTOR.
JOHN B. KRAELING
BY William D. Carothers
HIS ATTORNEY

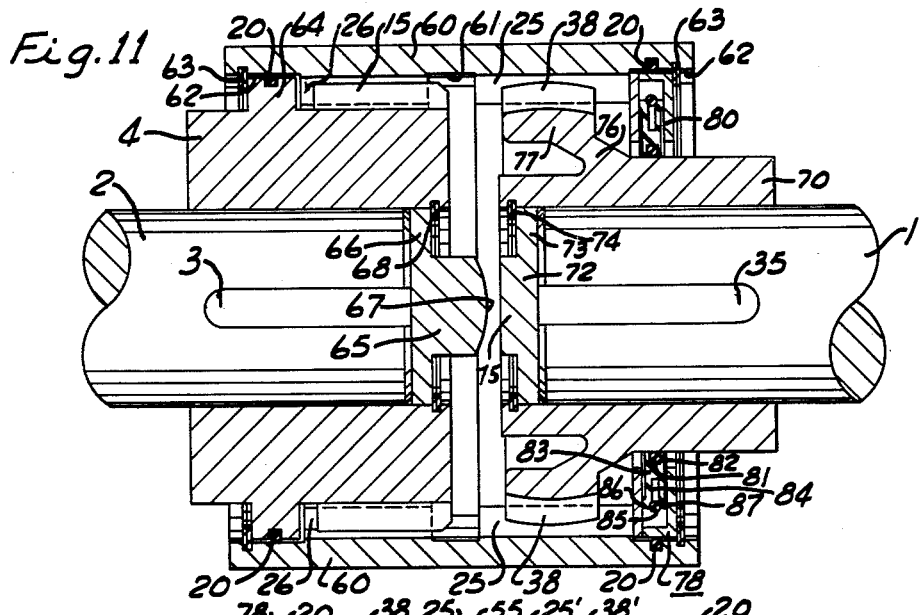

INVENTOR.
JOHN B. KRAELING
BY
HIS ATTORNEY

United States Patent Office 3,243,973
Patented Apr. 5, 1966

3,243,973
FLEXIBLE GEAR COUPLINGS
John B. Kraeling, Meadville, Pa., assignor to Drafto Corporation, Cochranton, Pa., a corporation of Pennsylvania
Filed Jan. 30, 1963, Ser. No. 254,884
16 Claims. (Cl. 64—9)

This invention relates generally to flexible gear couplings for transmitting rotary driving loads between aligned and angularly misaligned shafts and more specifically to a coupling having an improved external gear in combination with an improved cooperating internal gear.

There are many different shapes of teeth on the external gears employed in flexible gear couplings. These flexible coupling structures still present problems because attention has only been directed to the external gear.

In the present invention not only has the external gear of the flexible coupling been improved but also the internal gear has been improved to provide a novel combination.

The principal object of this invention is the provision of an external gear having a tooth from the pitch line and crown of which is generated along one branch of a hyperbolic curve the foci of which lies within or under the gear teeth. The gear may be referred to as an inverse hyperboloid. The teeth of the internal gear are basically standard involute and formed to properly mesh with the external gear teeth when in mesh and axially aligned with each other and these internal gear teeth remain the same. The external gear teeth have both side flanks reduced from the center of the tooth to its opposite ends to provide clearance and allow for angular axial adjustment between the intermeshed external and internal toothed members. The extent of this clearance is determined largely upon the extent of allowable angular misalignment to be allowed between the axes of the two intermeshed gears. The initial thickness of the centers of these teeth with their pitch lines and crowns formed along a hyperbolic curve remains the same so that all of these will provide lineal contact with all of the teeth of the internal gear when intermeshed in axial alignment. However, the clearance may vary from fourteen to forty-five degrees between a tangent of any of the four flank centers of the tooth and a plane bisecting the tooth longitudinally. This clearance follows a curve across the quarter flank surface which when generated by a hob will cut the clearance following a circle. This provides a new and improved external gear for a flexible coupling whether made of steel or plastic.

The internal gear, which in most installations is made of steel, is constructed as a sleeve and when the intermeshed internal and external gears have their axes disposed at an angle relative to each other then the intermeshed teeth only touch each other adjacent the horizontal toward the top and bottom of the gears or the vertical plane. When the clearance is cut for greater angular misalignment there is less opportunity for engagement between the intermeshed teeth adjacent the top and bottom of these gears. Thus the greater the clearance the less number of intermeshed teeth interengage each other. To improve this situation and provide for substantially full engagement regardless of the clearance the sleeve is constructed so that it will flex upon load transmission within the elastic limit of the sleeve. The teeth do not perceptibly change but the steel sleeve does. The load transmitted causes the sleeve to assume an oval shape while rotating by flattening at the top and bottom. This increases the contact between the teeth and the internal sleeve gear will contact between all of the interengaged teeth at the maximum angular inclination of their axes below the maximum full load of transmission.

The flexing of the whole sleeve also increases the area of the flank contact between the interengaged teeth thereby increasing the efficiency of power transmission as well as the rating of the flexible coupling.

The use of plastic external gears as well as plastic internal and external gears are known to provide flexible teeth in flexible couplings but these teachings do not suggest or otherwise support the flexing of the whole of the sleeve as accomplished here in steel internal sleeve gears to increase the contact of the interengaged teeth. However, this invention is applicable to plastic flexible couplings as well as all steel flexible couplings. The flexible teeth of the plastic flexible coupling disclosures could not be employed in all steel flexible couplings.

Another object is the provision of a flexible gear coupling for connecting the adjacent ends of two shafts required to transmit power under load between intermeshed internal and external gears the internal gears of which have standard involute teeth preferably identical to each other and formed in spaced series within a sleeve of steel that may flex when transmitting a load and the complementary external gears or at least one of the shafts being cut to follow a crown curve, preferably a hyperbolic curve, to provide clearance between the external and internal gear teeth on opposite sides of the angle of deviation of the shafts so the intermeshed teeth will not bind and this external gear is formed on the end of a sleeve cylindrical or conical which is a part of the shaft hub that permits the external gear to also flex when transmitting loads at an angle. Thus both the internal and external gear at one end of the coupling may flex. If both external gears are alike then both ends and both intermeshed gears may flex to take up the tooth clearances and provide toothed engagement for the transmission of power through all the teeth simultaneously when the shafts are at an angle to each other.

Other objects and advantages of this invention appear hereinafter in the following description and claims.

The accompanying drawings show for the purpose of exemplification without limiting this invention or the claims thereto, certain practical embodiments illustrating the principles of this invention, wherein;

FIG. 2 is an enlarged diagrammatic plan view showing the hyperbolic tooth of the external gear.

FIGS. 3 to 6 are enlarged diagrammatic views in section showing the cross section of the hyperbolic teeth cut for different degrees of clearance.

FIG. 9 is an enlarged sectional view of an extenral gear in which the teeth follow the path of a hyperbolic pitch line but the crown of the teeth follow a common radius.

FIG. 10 is a sectional view of a flexible gear coupling having a double hub each having teeth formed to follow a hyperbola.

FIG. 11 is a sectional view of a single flexible gear coupling wherein both the internal and external gears at one end are flexible.

FIG. 12 is a sectional view of a double flexible gear coupling wherein both the internal and external gears at both ends are flexible.

FIG. 13 is an enlarged modified form of seal.

Figure 1:
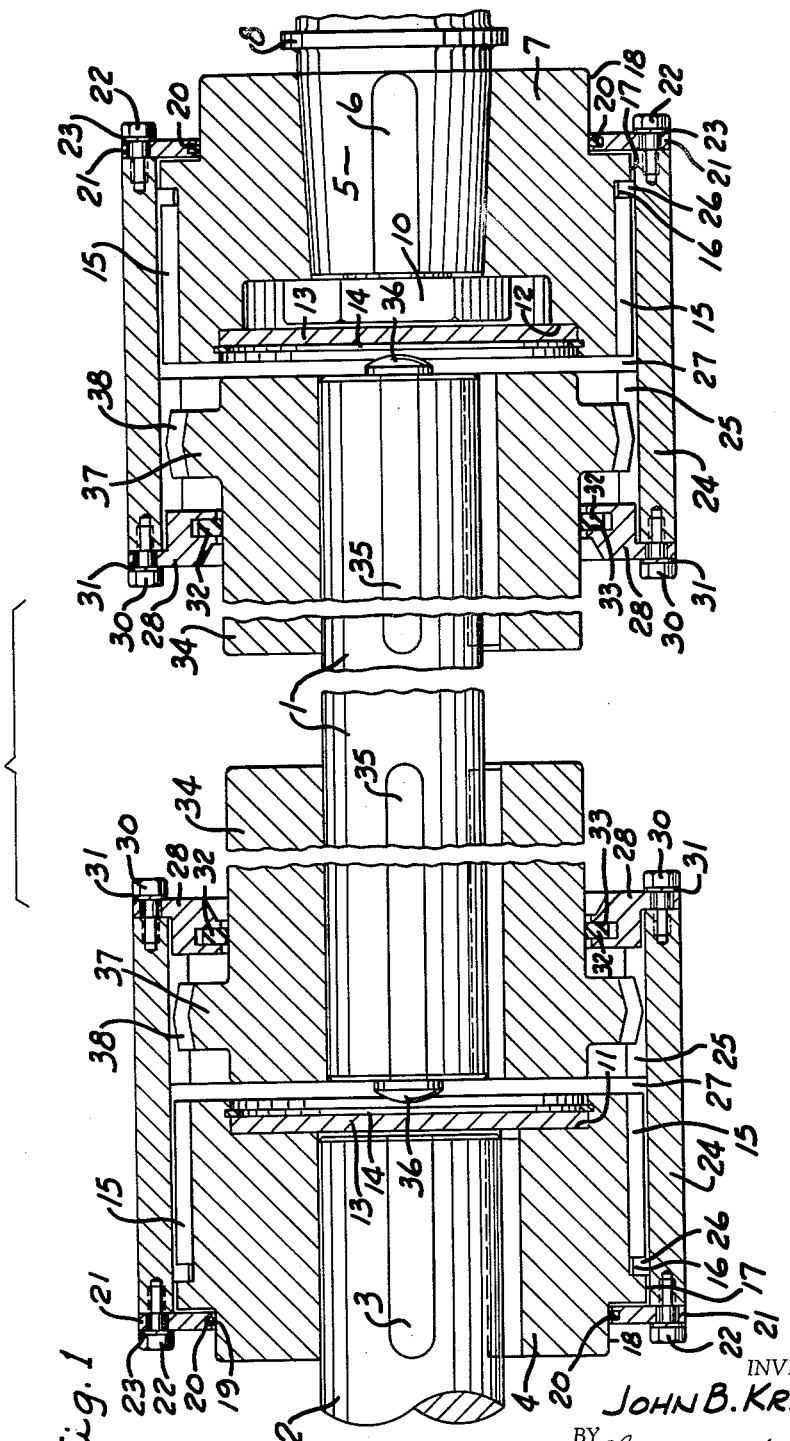
FIG. 1 is a sectional view of a practical structure of two flexible gear couplings on the opposite ends of an intermediate drive shaft for operating mill rolls.

Referring to FIG. 1 the flexible gear coupling is shown on the opposite ends of the intermediate drive shaft 1 which is intended to connect one of the driving mill rolling pinions with one of the mill rolls. The shaft 2 of the driving pinion is connected by means of the key 3 to the hub 4 at one end and the shaft 5 is connected by the key 6 to the hub 7 at the opposite end. The only difference between these hubs is that the end of the shaft 2 is substantially cylindrical whereas the end of the shaft 5 is tapered and extends from the roll neck 8. Otherwise the hubs are quite similar. In view of the fact that the shaft 5 is tapered its outer end is threaded to receive the nut 10 which secures the hub to the taper of the shaft 5. The hub 4 may have a pressed fit on the end of the shaft 2 and thus do not require a nut to hold the hub in place.

The hubs 4 and 7 are each provided with the concentric bores 11 and 12 respectively for receiving the thrust plate 13 that is locked in place by the expansion ring 14.

Involute teeth 15 are found on the perimetral surface of each of the hubs 4 and 7 and they extend from the end of their respective hubs to an annular groove 16 which is cut between the end of the teeth 15 and forms the annular shoulder 17. The inner end of each of the hubs 4 and 7 is reduced in diameter as illustrated at 18 for the purpose of receiving the sealing element 20 in the inner perimetral opening of the ring members 21 which are secured by means of the bolts 22 and the lock washers 23 to the ends of the sleeve 24.

Each of the sleeves 24 are solid flexible sleeves uninterrupted by slots or other openings and carry the internal teeth 25 and 26 which are preferably involute teeth and which are preferably the same and could be continuous. However, as shown the series of teeth 25 are separated from the series of teeth 26 by the space of no teeth or gap 27 which is conducive to the flexibility of the uninterrupted sleeve 24.

It will be noted that the two sets of teeth 25 and 26 in each sleeve 24 are the same in number as the teeth 15 on the hubs and intermesh therewith and represent the internalmost dimension of the sleeve and since these groups of teeth are ordinarily the same they may be formed at the same time and thereafter separated by cutting the gap 27 which may add to the flexibility of the sleeve 24.

The ends of the teeth 26 engage the flange 17 of the hub. However, the sleeves 24 are allowed axial play owing to the gap between the rings 21 and the flange 17. However, this clearance may be very slight because there is no relative movement between the hubs 4 and 7 and their sleeves 24 aside from the deformation of the sleeves during operation and it will be noted that sufficient clearance is provided between the flanges 17 and the sleeves 24 so as not to interfere with the flexibility of the sleeve.

The opposite or outer ends of the sleeves 24 are each provided with the rings 28 which are held in place by the bolts 30 and the lock washers 31 in a manner similar to the rings 21. The rings 28 are also provided with a flexible resilient annular seal member 32 which operates within sleeve washers of the ring bore 28.

It will be noted that the bolts 22 and 30 which are attached to the opposite ends of the sleeves 24 have a clearance in the openings through which they pass in the rings 21 and 28. It will be also noted that the inner bore of the ring 21 which is carried in the annular slot 19 is also spaced from the cylindrical surface of the hub.

Likewise, the inner bore of the ring 28 is spaced from the hub 34 of each coupling in the cylindrical surface of the hub 34. Again a clearance is provided between the outer cylindrical surface of the ring 28 and the inner surface of the sleeves 24. The purpose of these clearances is, of course, to provide adequate sealing protection to retain lubricant within the sleeves 24 so that their gear teeth will operate wholly within the lubricant at all times but these rings 21 and 28 will not interfere with the flexing of the sleeves 24 in their operation as flexible couplings.

Each of the hubs 34 are connected by the keys 35 on the opposite ends of the shaft 1 and each shaft end is provided with a thrust button 36 for engagement with their cooperating thrust plate 13.

Each hub is provided with an external gear portion 37, the teeth 38 of which are specifically formed as illustrated in FIGS. 2 and 9 and these teeth are the same in number and are constructed so that they will cooperate with the series of teeth 25 in the sleeve.

As diagrammatically illustrated in FIG. 2 the teeth 38 are constructed to have their pitch line 40 follow the path of a hyperbola. Likewise the crown line 41 into the root line 42 of the teeth 38 extends substantially equidistant from the hyperbolic pitch line 40. The hyberbolic pitch line 40 thus represents one branch of the hyperbola for each tooth face and their foci will lie within the external gear. Considering this tooth form as a solid, it would represent what may be called an inverse hyperboloid owing to the fact that the teeth are convex and not concave. However, this tooth form may be cut by a hob. In the structure as shown in FIG. 9 the tooth members 43 are likewise formed along the path of a pitch line 44 and the path of the crown of the teeth cutting and forming the same will produce the tooth root line 45 which is equidistant to the hyperbolic pitch line 44. The crown 46 of the tooth of this structure follows a radius which would be formed by reducing the crown of the teeth along the spherical surface having a common radius and this radius would be selected to be such that at least the ends of the teeth 43 may approximate the construction of a hyperbolic line 47 such as illustrated by dotted lines which would be equidistant from the hyperbolic pitch line 44.

The form of the teeth illustrated in FIGS. 2 and 9 for use on the hubs 34 will, of course, properly mate and engage the series of teeth 25 and the sleeve 24 on the axis of these members is concentric and the teeth are intermeshed. Thus this selection of the teeth may control the size and shape of the involute teeth 25 and 26 which in turn will control the shape of the teeth 15 on the hubs 4 and 7. Thus it is the object of this invention to provide a tooth shape which is based on a definite hyperbola and which would accommodate various angles and with the various shape and wear characteristics between the external and internal gear teeth of the flexible coupling. The particular tooth structures 38 and 43 are shaped to reduce the error of tooth contact between the external and internal gears and thus reduce the errors of tooth contact to a minimum at various angles of the tooth shaft 1. This feature in combination with the elastic nature of the steel or other materials from which the sleeves 24 are made improve the contact between the teeth. They are angularly disposed relative to each other and thus combine their separate novel features to provide an improved flexible coupling. The hyperbolic curve of the pitch line of these teeth in combination with the flexibility of the sleeves within the elastic limit of the steel will provide an improved flexible coupling that has a greater and stronger tooth contact thereby allowing more teeth to carry the load.

These teeth may be made by providing a hob to generate the specific profile of the different tooth forms and controlling the distance between the hob and the gear so that it will cut along a hyperbolic path as the hob travels across the face of the gear generating an involute profile in the teeth at the same time that the gear rotates. The hob will thus generate an inverse hyperboloid the pitch shape of which permits it to mesh with the hob pitch diameter which is at the hob pitch line. The involute hob errors can be corrected by utilizing large diameter hobs or specially designed hobs.

By the use of this method of forming the teeth a coarser pitch tooth may be employed which provides a better geometric contact between the teeth and the flexure of the steel sleeves within their elastic limit permits an increased load to be carried by these flexible gear couplings. This path improvement permits the flexible gear coupling not only to increase its load carrying capacity, but to improve the smoothness of its operation upon the transfer of load upon the teeth as they move into and out of the load carrying zones which are diametrically opposed to each other.

The hyperbolic curvature of the flanks of the teeth becomes greater as the pressure angle of the involute generation becomes greater or increases. A 30° involute pressure angle generation will show greater hyperbolic generation or greater curvature of the teeth than that of a 20° involute generation. By the same token a 45° involute pressure angle generation would nearly duplicate the hyperbolic shape of the hob path on the flanks of the teeth. The increase of the involute pressure angle generation not only gives more angularity or misalignment capacity with a given inverse hyperboloid generation but also gives greater diametrically opposed resultant forces which tend to distort the sleeve into an oval shape for better distribution of the tooth loads. The sleeve itself is the member which actually changes its shape and thus is effective on the teeth without their being materially changed.

This type of flexible tooth gear coupling when used in double engagement such as illustrated in FIG. 10 is also usable in half flexible couplings as shown in FIG. 1 wherein the floating shaft 1 will transmit greater amounts of horsepower to the rolls of a roll mill for rolling steel, aluminum, copper or any other metal.

Referring to FIGS. 3 to 6 which show different degrees of involute pressure angle generation in forming the clearance between the teeth of the hub and the internal teeth of the sleeve and wherein the central portion of each tooth represents the center of the hyperbola as viewed on the construction plane 48 of FIGS. 2 and 9 which plane is transverse of the axis of the shaft 1 at right angles thereto and which plane is likewise represented in each of the FIGS. 3 to 6.

As shown in FIG. 3 if the thickness of the tooth as indicated at 50 is the same in each of these figures, the involute pressure angle generation is shown to be 45° in FIG. 3 and such an angle formed for clearance provides a tooth cross section that is thin adjacent the ends of the teeth as illustrated. As this involute pressure angle generation decreases to 30° as shown in FIG. 4 and to 20° as shown in FIG. 5 and to 14½° as shown in FIG. 6 the width of the tooth adjacent thereover has been increased. Sufficient tooth area engagement between the concentric gears would be sufficient to effectively transmit a load between the coupling and the angularly disposed shafts.

The coupling sleeves are shown in FIG. 1 if constructed of material greater than 17½ inches in diameter and having a thickness of 1¼ inches at the position of the teeth 25 and 26 will flex approximately 0.008 inch under a load of 3,000 pounds. Thus with a load of 1600 horsepower operating at 100 r.p.m. through a coupling of this character would produce an outward thrust of approximately 3600 pounds at 90° to the direction of misalignment which distortion would be sufficient to close the clearance between the teeth 38 formed at a 30° involute pressure angle generation as shown in FIG. 4. Of course, a steel sleeve of this character is really thicker than need be. In other words, a sleeve materially less than 1¼ inches thick could transfer this load and produce a greater flexing within the elastic limit of the steel and within the physical endurance of the sleeve 24.

Figure 7:
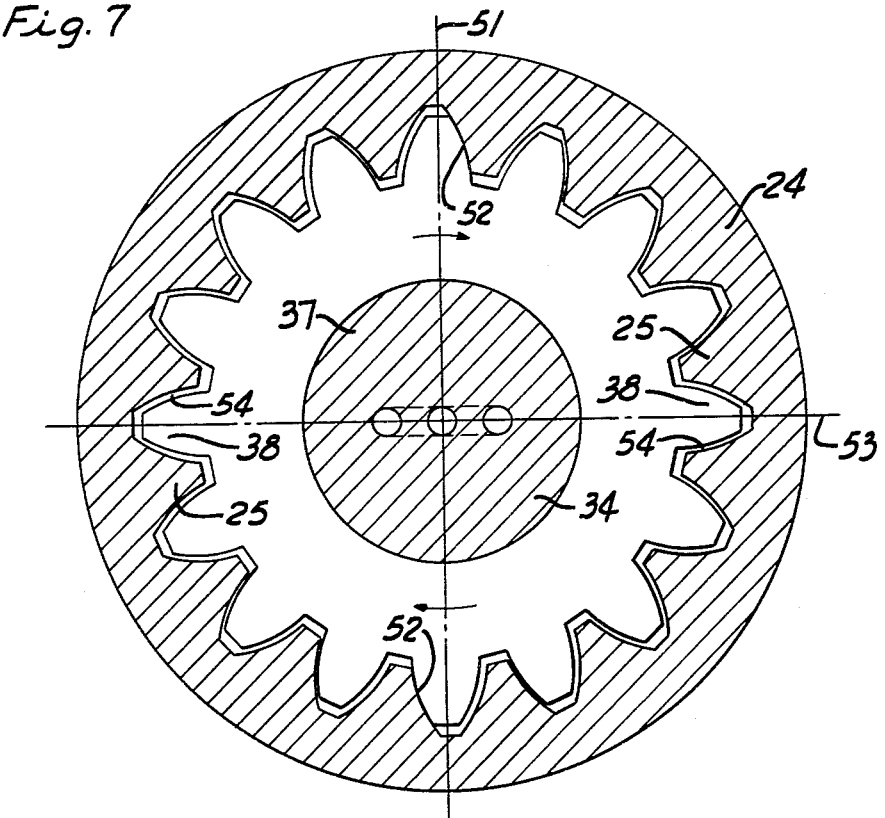
FIG. 7 is an enlarged diagrammatic view illustrating the tooth engagement between engaged internal and external gears of the flexible gear coupling comprising this invention.

Referring to FIG. 7 which is a diagrammatic view illustrating the tooth engagement between the interengaged internal and external gears of the flexible gear coupling illustrating that there is a drive from the external gear in a clockwise direction and that there is a tooth engagement between the teeth of the external central gear member and the internal sleeve gear 24 along the horizontal construction line 51 and the clockwise torque transmitted therebetween is on opposite sides of the gear. In accordance with the shape of these gear teeth this engagement will extend on opposite sides of the horizontal but as it approaches the top and the bottom as indicated by the vertical construction axis 53 there is no engagement between the teeth 38 and the teeth 25 as indicated by the reference numerals 54 by the clearance 54 between the teeth at these positions. This would be the exact situation when there is very little or no load transmitted by the shaft 34 and through the coupling. However, upon the increase of load at the positions 52 the contact between the interengaged teeth 25 and 38 will spread from the construction line 51 to the construction line 53 owing to the flexing of the sleeve gear 24. Thus with a transmission of load the sleeve gear will provide a tooth engagement for the transfer of load from one gear to the other through 360°. This, of course, will increase the load within limits and, of course, depends upon not only the size of the gear 24 but also upon the thickness of its wall and the nature of the material it is made from and the manner in which it has been treated. In any event the gear 24 is flexed within its elastic limit by the gear itself. In this manner the choice of these different factors may be made to suit the size and the job that the gear has to do so as to provide 360° contact between the teeth at the highest operating load. In view of the fact that the load is initiated along the horizontal axis 51, assuming that the tilt or angular disposition of the shaft 1 is, of course, along the vertical axis 53, the gear will, of course, be continuously flexed as it rotates and it would assume in FIG. 7 a flat or oval shape. As illustrated in FIG. 1 the sleeve gear 24 is approximately 17¼ inches outside diameter and has a wall thickness in the vicinity of the teeth 25 and 26 of approximately 1¼ inches. A gear of this size with a load of 3000 pounds across its O.D. will flex within its elastic limit to approximately 0.008 inch. Thus with a 30° tooth as illustrated in FIG. 4 in a gear of this size transmitting 1600 horsepower at 100 r.p.m. would have an outward thrust of 3600 pounds at 90° to the direction of the misalignment or along the horizontal axis 51 as shown in FIG. 7 and the degree of misalignment would insure contact between the gear teeth within the elastic limit of the sleeve gear 24 providing contact between all the teeth as the sleeve gear 24 rotates and each section approaching the vertical axis would be flexed so as to assume an oval shape and thereby take up the clearance between the teeth causing them to engage and distribute the torque in driving from the shaft 1 through the teeth 38 to the teeth 25 in the sleeve gear 24.

Figure 8:
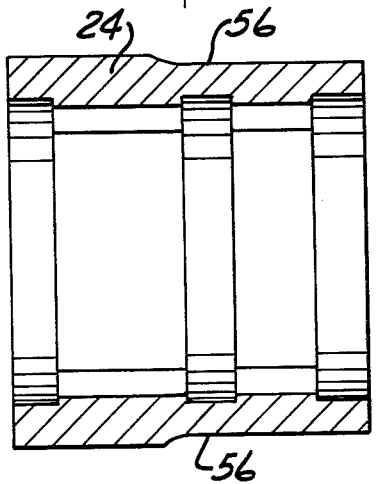
FIG. 8 is an enlarged sectional view of an internal sleeve gear having a thin cylindrical wall.

In the structure of FIG. 8 the sleeve gear is materially thinner than 1¼ inch. It is in fact illustrated to be just somewhat thicker than the depth of the teeth 25 and 26. This thinner gear is capable of a greater degree of flexure and being constructed from an alloy that provides sufficient elasticity within its elastic limit will readily flex in operation to provide ample engagement between the internal and external teeth of the flexible coupling.

Referring now to FIG. 10 having teeth formed to follow a hyperbola and this construction shows a larger gap provided between the ends of the hub shafts 1 and 2 and the mating internal gear lengths 25 and 25′ within the sleeve 55 and the flexing of the whole of the sleeve gear 55 is effective on both sets of teeth 25 and 25′ to continuously deform the sleeve as it rotates and delivers power for the purpose of taking up clearance between the teeth 38 and 38′ on the hub members 34 and 34′.

Thus a flexing of the sleeve gear 25 and 25' may be effective for use with a single or a double external gear shape to follow a hyperbola. In the double form the hyperbola can be employed to form one gear and one gear may be different than the forming of the other gear. In other words, it is sometimes desirable to employ a gear with a different hyperbolic contour when it is the driven gear rather than the driving gear, which would be illustrative of the gear on opposite ends of the shaft 1 or on opposite ends of the coupling as illustrated in FIG. 10. In any event the steel or alloy sleeve gear is chosen so that it will continuously flex within its elastic limit of a long period of time and without molecular heat. That would create an internal heat that would seriously change the grain structure to weaken the same and cause failure.

A step such as illustrated in FIG. 8 at 56 may be employed to increase the flexibility of that section of the sleeve 24 so as to provide greater flexibility in the sleeve during operation and particularly where it is needed. The flexure of the sleeve over the gear section 26 is reduced by the shoulder 56. However, the flexure with or without the shoulder or regardless of the thickness of the sleeve gear is determined so that it may properly perform its function without undue wear between the long involute teeth of the gear series 15 and 26.

The coupling shown in FIG. 11 provides a half flexure in that both the internal and external gears at one end will flex. The flexable gear coupling connecting the two shafts 1 and 2, the taller being the driving shaft and has the key 3 for the hub 4 for press fit on the shaft 2 which has the involute teeth 15 on its perimetral surface. This external gear meshes with the internal involute gear teeth 26 in one end of the sleeve 60, the other end having the internal involute gear teeth 25 spaced therefrom by the recess 61. The ends of the sleeve 60 have the enlarged bores 62 with the inserted double split locking rings 63. The hub 4 has an annular abutment 64 to support the O-ring sealing element 20 on the bore 62. The end of the shaft 2 has the button abutment 65 with a full flange 66 and a central projecting spherical abutment 67 and locked by the flange split ring locks 68.

The end of the shaft 1 is provided with the key 35 to lock the hub 70 that has a press fit on the shaft 1. The complementary abutment 72 has a full flange 73 locked by the split ring locks 74 and has a central transverse abutment face 75 to be engaged by the spherical abutment face 67.

The hub 70 has the annular sleeve 76 a frusto conical shape that carries the gear 77 provided with the teeth 38 that mesh with the teeth 25 in the sleeve 60. The gear 77 is enclosed in the sleeve 60 by the seal 78 having a metal or plastic jacket 80 of U-shaped cross section and sealed by the O-ring 20 on its outer perimeter and against the hub 70 by the O-ring 81 held in the annular slot 82 in the bore of the flexible seal body 83 preferably made of rubber or plastic and having a perimetral deep slot 84 which receives the contracting annular member 85 which may be a garter spring such as an O-ring or a helical wire spring or a flexible hoop of solid wire with its ends resiliently held together. Each is stretched and placed in the groove 85 to force the seal lips 86 and 87 into sealing relation. The garter spring 85 is larger in cross section than the width of said slot 84 to expand the sides of the seal 83 to force the lips outwardly and create a sealing relation between the annular sealing edges 86 and 87 and the inner surfaces of the seal jacket 80. Although there is no relative rotary movement between the sleeve 60 and the hub 70 there is continuous radial flexing causing radial movement between these parts and causing these seals to work. They enclose the chamber within the sleeve 60 and retain therein a lubricant which may be fluid or viscose. The seal member 83 stays with the hub 70 while the housing 82 stays with the sleeve 60 and the radial movement takes place between the annular sealing edges 86 and 87 and the inner surfaces of the jacket 80. These rubber parts are graphite impregnated.

In the structure of FIG. 12 the sleeve 55 with the internal gear teeth 25 and 25' which are identical to each other and form identical internal gears of the involute type. This balanced or symmetrical sleeve 55 with its central groove 61 is flexible upon transmitting loads between these internal gears 25 and 25' and their counterparts 38 and 38' forming the gears 77 which are arcuately crowned and preferably following a hyperbolic curve. Each specially formed gear 77 is mounted on the outer end of its flexible sleeve 76 that is preferably integral with the hub 70 keyed to its respective shaft 1 and 2. Thus each annular sleeve 76 a frusto conical shape may flex to produce an oval gear 77 together with the flexing of the sleeve 55 and the gears formed thereon by the teeth 25 and 25' will likewise flex into an oval shape and due to the flexibility of both internal and external mating gears disposed at an angle relative to each other there is engagement between each corresponding tooth of the intermeshed mating gears for the full circumference thereof rather than as illustrated in FIG. 7. Since each gear of this mating pair are made flexible they will engage all of their teeth at lighter loads when rotating at high speeds. These flexible gears 55 and 77 thus continuously breath in flexing when transmitting loads at any speed due to the angularity of their axes relative to each other. This flexibility of the material, which is preferably steel, is within the elastic limit of the material and thus the working is not harmful. If the flexing is maintained well within the elastic limit of the material the material will not crystalize and fail. This is, of course, aided by selecting the proper cross section of the steel for the load and limiting angles of deviation of the shafts together with the material or steel to be employed. The teeth transmit the load and if the material is not an elastomer but steel these teeth do not change or flex as compared to the gear body such as the sleeve 24, 55, 56, 60 and 77. Thus the gears here change shape and become oval and the teeth remain their sturdy selves to transmit the load. This is the important feature and advantage of this invention.

Thus a single flexing internal sleeve gear of FIGS. 1, 8 or 11 will not have the flexibility of the dual flexing sleeve of FIGS. 10 and 12 but greater contact is obtained when both gears internal and external are flexed as in FIG. 10. The greatest, quickest contact is, of course, obtained with the structure of FIGURE 12, where both gears on each shaft are flexible. Thus with least effort greatest contact at lowest load transmission is obtained with the structure of FIG. 12.

With reference to the seals, that are shown at 78 is preferably between gear axes that are disposed at an angle to each other. The seal body 83 may be made of any elastomer but it is preferably made of a graphite impregnated rubber. It can be nylon or teflon. As shown in FIG. 13 the seal shown has the same housing 80 of metal which may be made in one or two parts each of which is either assembled after the seal is inserted or each housing piece namely the flat washer 90 and the L-shaped member 91 retain their separate identity. The flat washer 90 may be seated in the bore 62 and against the shoulder formed by the teeth 25 or the sleeve gear 24 or 55. Once in place, this washer will stand. The O-ring 20 is then inserted and the seal body 83 and the L-shaped angle member 91 is inserted over the O-ring 20 to compress the same and close the chamber 92 of the seal. The seal body 83 or 94 has been mounted on the perimetral surface of the hub 70 and its inner perimeter in the form of the O-ring 81 or the inner sealing surface 95 embraces the hub surface to maintain its seal. This completes the seal and the inner faces of the housing members 90 and 91 remain in contact against the opposite faces of the seal 94 because the angle 96 of the L-member 91 is shorter than the thickness of the seal 94 and thus the split rings 63 maintain the seal surface of the housing member 91 against the seal 94 yet radial movement is permitted. The same axial movement is created because of the difference in the axial angles of the internal gear sleeves and the shafts but this is assumed by the seal 95 or the O-ring 81 along the hub of the members 70.

These seal elements which may be an elastomer such as natural rubber or plastic and the seal 95 is preferably a plastic such as nylon or Teflon. Both the seal bodies 83 and 94 may be continuously annular but they may be a straight piece shaped to form a ring with the abutting ends sealing against each other.

Figure 14:
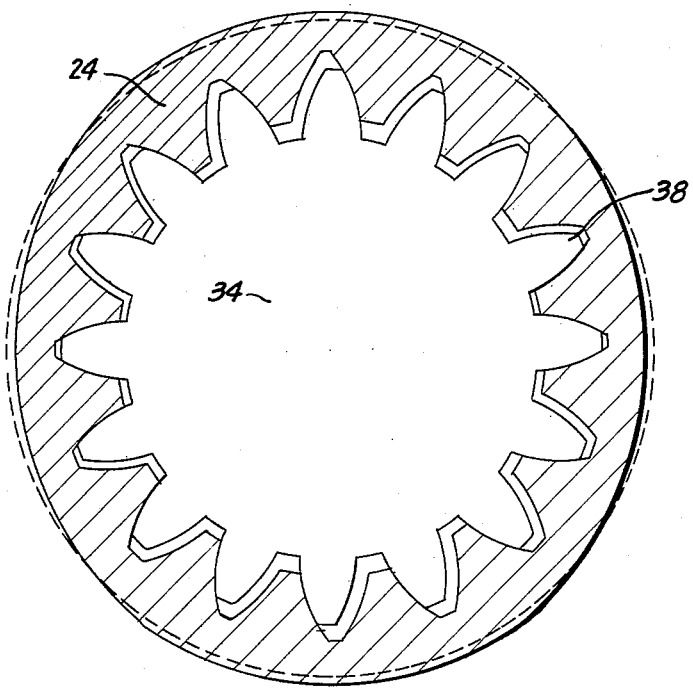
FIG. 14 is a view with a coupling sleeve in section on a solid hub and a sleeve torque conditioned and flexed into elliptical shape.
Figure 15:
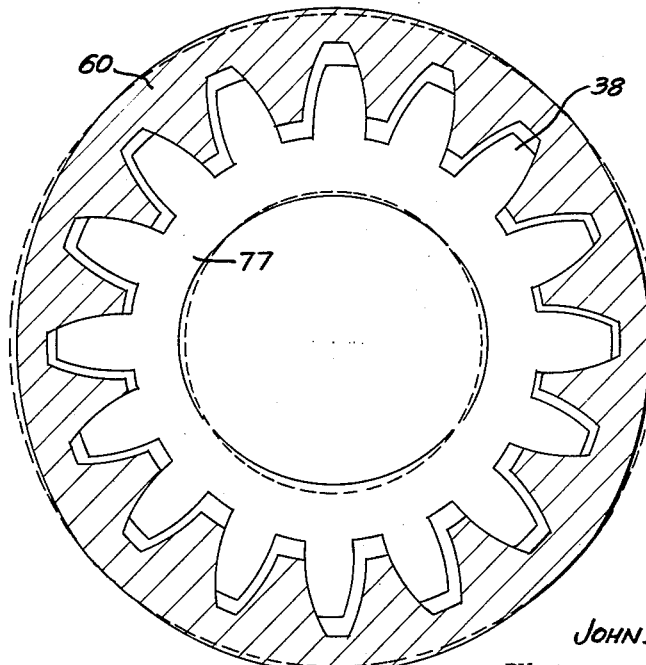
FIG. 15 is a view with a coupling sleeve in section on a hollow hub and torque conditioned sleeve and hub both flexed into elliptical shape.

FIGS. 14 and 15 indicate respectively a solid hub and a hollow hub wherein the coupling is under a torqued condition to flex the sleeve into elliptical shape as shown in FIG. 14 and to flex both the sleeve and the hub into elliptical shape as shown in FIG. 15. The solid lines of these views depict the elliptical shape of the sleeve in both figures and the hub in FIG. 15; whereas the dotted or broken lines indicate the normal circular condition of the coupling when not being subjected to transmission of loads.

I claim:

1. A flexible coupling for connecting the adjacent ends of two shafts consisting of an uninterrupted metal hub for each shaft, an external gear on each hub, an uninterrupted metal sleeve having an internal gear with the same number of teeth as each external gear to intermesh with the teeth of each hub gear when telescoped thereover, the teeth of at least one hub gear having the shape that follows a hyperbolic curve to provide clearance between the intermeshed teeth at the top and bottom of the angle of deviation between the axis of said one hub and the axis of said sleeve to permit rotation without binding within a range from zero degrees to a predetermined maximum angle, said uninterrupted sleeve being flexible to assume a continuously changing oval shape to provide increased tooth contact with the hyperbolic shaped external gear teeth while transmitting the load through the teeth when said one hub is disposed at an angle of deviation.

2. The flexible coupling of claim 1 characterized in that the both of said internal gears are parallel with the sleeve axis.

3. The flexible coupling of claim 1 characterized in that the teeth of said gear on said other hub and the teeth of said internal gear are parallel to their respective axes.

4. The flexible coupling of claim 1 characterized in that said internal gear is in two sections, one for each hub gear, with a space with no teeth therebetween.

5. The flexible coupling of claim 1 characterized in that the teeth of said one hub gear have a curvature which is defined as being generated axially along meshing hyperbolic curves.

6. The flexible coupling of claim 1 characterized in that the teeth of said one hub gear have a curvature which is defined as being generated axially along a hyperbolic curve having a common intermeshing pitch line with its corresponding internal gear.

7. A flexible coupling for connecting the adjacent ends of two shafts consisting of an uninterrupted metal hub for each shaft, an external gear on each hub, an uninterrupted metal sleeve having an internal gear with the same number of teeth as each external gear to intermesh with the teeth of each hub gear when telescoped thereover, the teeth of at least one hub gear having the shape that follows a hyperbolic curve to provide clearance between the intermeshed teeth at the top and bottom of the angle of deviation between the axis of said one hub and the axis of said sleeve to permit rotation without binding within a range from zero degrees to a predetermined maximum angle, the body of one of said engaging gears being flexible to assume a continuously changing oval shape to provide increased tooth contact with the hyperbolic shaped teeth while transmitting heavy loads to close said clearance for transmitting the load through the teeth when said one gear is disposed at an angle of deviation.

8. A flexible coupling for connecting the adjacent ends of two shafts consisting of an uninterrupted metal hub for each shaft, uninterrupted external gear on each hub, connected uninterrupted internal gears having the same number of teeth and meshing with said external gears, the teeth of said gears being the same in number and intermeshing, the teeth of at least one of said external gears having the shape to follow a hyperbolic curve that provides clearance between the intermeshed teeth at the top and bottom of the angle of deviation between the axes of said shafts to permit rotation without binding within the range from zero degrees to a predetermined maximum angle, a flexible sleeve means mounted to support at least one of said gears which sleeve will flex and its gear will assume a continuously changing oval shape to provide increased tooth contact through the hyperbolic shaped teeth while transmitting heavy load to close said clearance for transmitting the load simultaneously through the teeth when one shaft is disposed at an angle to the other.

9. A flexible coupling for connecting the adjacent ends of two shafts consisting of an uninterrupted metal hub for each shaft, an uninterrupted external gear on each hub, connected uninterrupted internal gears having the same number of teeth and meshing with said external gears, the teeth of at least one of said external gears having the shape to follow a hyperbolic curve that provides clearance between the intermeshed teeth at the top and bottom of the angle of deviation between the axes of said shafts to permit rotation without binding within the range from zero degrees to a predetermined maximum angle, a flexible sleeve means mounted to support at least one of said gears which sleeve will flex and its gear will assume a continuously changing oval shape to provide increased tooth contact through the hyperbolic shaped teeth while transmitting heavy load to close said clearance for transmitting the load simultaneously through the teeth when one shaft is disposed at an angle to the other, said flexible sleeve means constructed on at least one of said hubs for carrying the external gear thereof.

10. The flexible coupling of claim 9 wherein said flexible sleeve means of said external gear includes the sleeve on which said gear is cut.

11. A flexible coupling for connecting the adjacent ends of two shafts, consisting of an uninterrupted metal hub for each shaft, an uninterrupted external gear on each hub, connected uninterrupted internal gears having the same number of teeth and meshing with said external gears, the teeth of at least one of said external gears having the shape to follow a hyperbolic curve that provides clearance between the intermeshed teeth at the top and bottom of the angle of deviation between the axes of said shafts to permit rotation without binding within the range from zero degrees to a predetermined maximum angle, a flexible sleeve means mounted to support at least one of said gears which sleeve will flex and its gear will assume a continuously changing oval shape to provide increased tooth contact through the hyperbolic shaped teeth while transmitting heavy load to close said clearance for transmitting the load simultaneously through the teeth when one shaft is disposed at an angle to the other, flexible sleeve means is a portion of said formed hub the hub including the external gear on the end of a frusto conical sleeve.

12. A flexible coupling for connecting the adjacent ends of two shafts consisting of an uninterrupted metal hub for each shaft, an uninterrupted external gear on each hub, connected uninterrupted internal gears having the same number of teeth and meshing with said external gears, the teeth of at least one of said external gears having the shape to follow a hyperbolic curve that provides clearance between the intermeshed teeth at the top and bottom of the angle of deviation between the axes of said shafts to permit rotation without binding within the range from zero degrees to a predetermined maximum angle, a flexible sleeve means mounted to support at least one of said gears which sleeve will flex and its gear will assume a continuously changing oval shape to provide increased tooth contact through the hyperbolic shaped teeth while transmitting the heavy load to close said clearance for transmitting the load simultaneously through the teeth when one shaft is disposed at an angle to the other, the hub of each shaft contains a member formed to flex and includes an external gear on the end of a conical sleeve, and said internal gear is said flexible sleeve means with two connected internal gear sections each in mesh with its respective external gear, said external and internal gears being selected and formed to flex and assume with each other a continuously changing oval shape when transmitting heavy loads to close said clearance for transmitting the load through all the teeth between both external and internal gears when one shaft is disposed at an angle of deviation to the other shaft.

13. A flexible steel coupling for connecting the adjacent ends of two shafts capable of having an angle of deviation therebetween consisting of a solid metal hub on each shaft, a solid frusto conical flexible sleeve on each hub, an arcuate external toothed gear on the outer end of each frusto conical sleeve to provide clearance between the teeth at opposite sides of the angle of deviation, said external teeth of which follow a hyperbolic curve, a flexible sleeve having an internal gear part for each external gear on said hubs and in mesh therewith, said external and internal gears together with said flexible sleeve assume with each other a continuously changing oval shape when transmitting heavy loads to close the clearance for the transmission of the load through all the teeth when one shaft is disposed at an angle to the other shaft.

14. The flexible coupling of claim 13 which also includes a seal between the outer ends of said sleeve and said hubs to form a gear chamber and to retain a lubricant therein.

15. The flexible coupling of claim 14 wherein said seal includes a housing, an O-ring sealing said housing to said sleeve bore and having an annular radial chamber open to said corresponding hub, an elastomer seal member sealing in said chamber and embracing and sealing on said hub.

16. The flexible coupling of claim 15 wherein said elastomer compresses a body in annular arrangement and having a radial groove in its bore and in its perimetral surface, an O-ring in each groove, the O-ring in said bore groove sealing on said hub, the O-ring in said perimetral groove being greater than the width of said groove to move the lips of said seal member outwardly.

References Cited by the Examiner

UNITED STATES PATENTS

| | | | |
|---|---|---|---|
| 1,942,782 | 1/1934 | Smith | 64—9 |
| 2,035,171 | 3/1936 | Loewus | 64—9 |
| 2,332,068 | 10/1943 | Fast | 64—9 |
| 2,687,025 | 8/1954 | Wildhaber | 64—9 |
| 2,841,966 | 7/1958 | Belden et al. | 64—9 |
| 2,906,106 | 9/1959 | Hass | 64—8 |
| 2,918,809 | 12/1959 | Miller | 64—11 |
| 2,922,294 | 1/1960 | Wildhaber | 64—9 |
| 2,924,954 | 2/1960 | Panhard | 64—9 |

FOREIGN PATENTS 377,761  8/1932  Great Britain.

BROUGHTON G. DURHAM, *Primary Examiner.*

ROBERT C. RIORDON, *Examiner.*